(12) United States Patent
Roberts et al.

(10) Patent No.: US 10,538,295 B2
(45) Date of Patent: Jan. 21, 2020

(54) FLOATING BASE

(71) Applicants: Peter Andrew Roberts, Alfred Station, NY (US); Stephen M. Bonan, Alfred, NY (US); Benjamin L. Cleaver, Williamsville, NY (US); Matthew P. Frietag, Dahlgren, VA (US); Charles A. Heulitt, IV, Middlesex, NJ (US); Ryan P. Miller, Gray, ME (US); Michael J. McGrath, Toronto (CA)

(72) Inventors: Peter Andrew Roberts, Alfred Station, NY (US); Stephen M. Bonan, Alfred, NY (US); Benjamin L. Cleaver, Williamsville, NY (US); Matthew P. Frietag, Dahlgren, VA (US); Charles A. Heulitt, IV, Middlesex, NJ (US); Ryan P. Miller, Gray, ME (US); Michael J. McGrath, Toronto (CA)

(73) Assignee: Spherical Block LLC, Alfred Station, NY (US)

( * ) Notice: Subject to any disclaimer, the term of this patent is extended or adjusted under 35 U.S.C. 154(b) by 0 days.

(21) Appl. No.: 15/960,675

(22) Filed: Apr. 24, 2018

(65) Prior Publication Data

US 2019/0322337 A1     Oct. 24, 2019

(51) Int. Cl.
| | |
|---|---|
| *B63B 35/44* | (2006.01) |
| *B63B 5/14* | (2006.01) |
| *B63B 3/06* | (2006.01) |
| *B63B 5/24* | (2006.01) |

(52) U.S. Cl.
CPC ............... *B63B 35/44* (2013.01); *B63B 3/06* (2013.01); *B63B 5/14* (2013.01); *B63B 5/24* (2013.01); *B63B 2035/4426* (2013.01)

(58) Field of Classification Search
CPC .................................. B63B 35/44; B63B 5/24
See application file for complete search history.

(56) References Cited

U.S. PATENT DOCUMENTS

| | | | | | |
|---|---|---|---|---|---|
| 3,165,083 | A | * | 1/1965 | Romero | ................. B63B 11/00 |
| | | | | | 114/65 R |
| 4,275,679 | A | * | 6/1981 | Finsterwalder | ..... B63B 35/4413 |
| | | | | | 114/264 |
| 4,959,453 | A | * | 9/1990 | Sweeny | ................. D21H 13/26 |
| | | | | | 528/336 |
| 5,205,765 | A | * | 4/1993 | Holden | .................... B63H 1/18 |
| | | | | | 440/38 |

(Continued)

FOREIGN PATENT DOCUMENTS

| | | |
|---|---|---|
| CA | 2723771 | 11/2009 |
| EP | 2274198 | 1/2011 |
| IN | 201621005984 | 10/2017 |

*Primary Examiner* — S. Joseph Morano
*Assistant Examiner* — Jovon E Hayes
(74) *Attorney, Agent, or Firm* — Tracy Jong Law Firm; Tracy P. Jong; Cheng Ning Jong

(57) ABSTRACT

A floating base comprising a shell constructed from a plurality of blocks reinforced using a plurality of tensile elements. The shell includes an inner space, a length, a width and at least one bulkhead disposed across the width along the length of the shell within the shell to strengthen the shell. In one embodiment, the shell further includes a spine disposed substantially at right angle to the at least one bulkhead to further strengthen the shell.

10 Claims, 9 Drawing Sheets

(56) References Cited

U.S. PATENT DOCUMENTS

| | | | | |
|---|---|---|---|---|
| 5,421,282 A * | 6/1995 | Morris | B63B 35/34 | 114/264 |
| 5,477,798 A * | 12/1995 | Ness | B63B 3/13 | 114/312 |
| 5,647,693 A * | 7/1997 | Carlinsky | B63B 35/44 | 405/229 |
| 6,125,780 A * | 10/2000 | Sweetman | B63B 3/06 | 114/264 |
| 6,199,502 B1 * | 3/2001 | Mattson | B63B 5/18 | 114/266 |
| 6,860,219 B1 * | 3/2005 | Dempster | B63B 21/22 | 114/264 |
| 7,128,016 B2 * | 10/2006 | Olthuis | B63B 3/185 | 114/266 |
| 7,213,531 B2 * | 5/2007 | Ahern | B63B 3/08 | 114/263 |
| 7,426,898 B1 * | 9/2008 | Ahern | B63C 1/02 | 114/263 |
| 8,613,570 B2 * | 12/2013 | Westre | B63B 9/065 | 114/264 |
| 9,133,619 B1 * | 9/2015 | Roberts | E04C 1/00 | |
| 9,365,267 B2 * | 6/2016 | Haider | B63B 3/08 | |
| 9,809,971 B2 * | 11/2017 | Roberts | E04B 1/3211 | |
| 2005/0145159 A1 * | 7/2005 | Barsoum | B63B 3/09 | 114/356 |
| 2009/0173269 A1 * | 7/2009 | Brown | B63B 35/44 | 114/264 |
| 2011/0123275 A1 * | 5/2011 | Nelson | B63B 35/44 | 405/211 |
| 2011/0132250 A1 * | 6/2011 | Nelson | E04H 1/04 | 114/266 |
| 2014/0216324 A1 * | 8/2014 | Schopfer | B63B 35/44 | 114/266 |
| 2014/0326359 A1 * | 11/2014 | Bennett | B29C 41/04 | 141/1 |
| 2016/0215518 A1 * | 7/2016 | Villman | H01Q 1/1242 | |
| 2016/0237705 A1 * | 8/2016 | Wee | B63B 17/02 | |

* cited by examiner

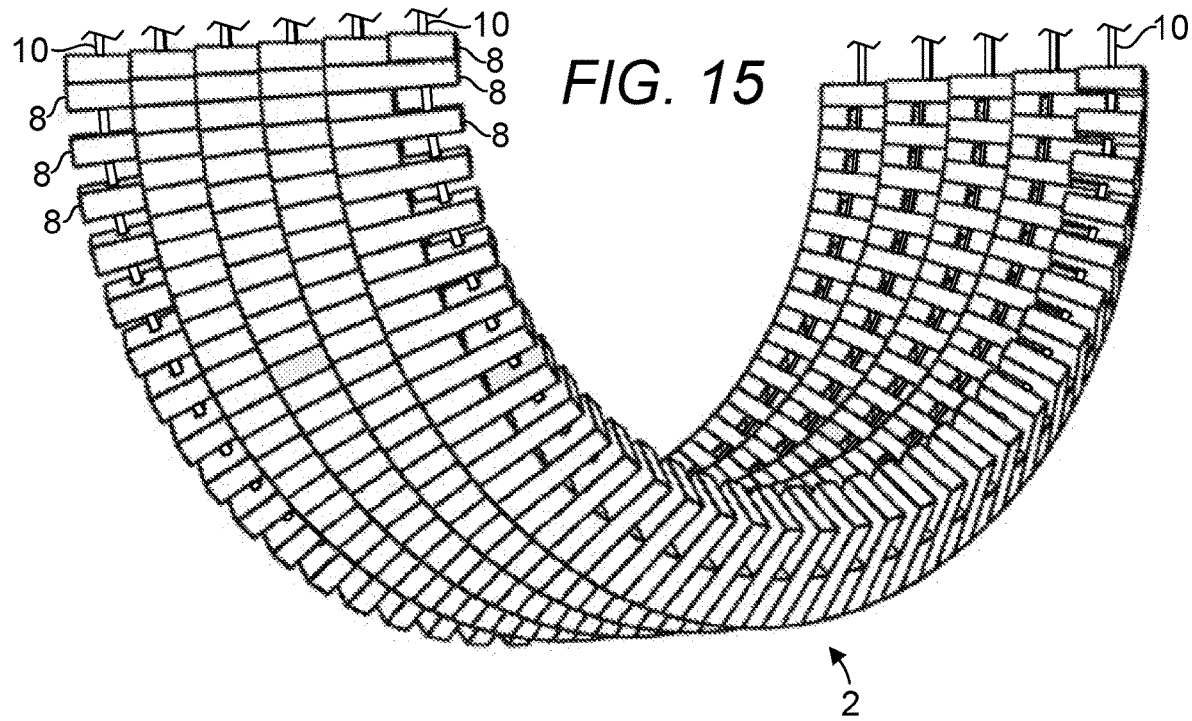
FIG. 15
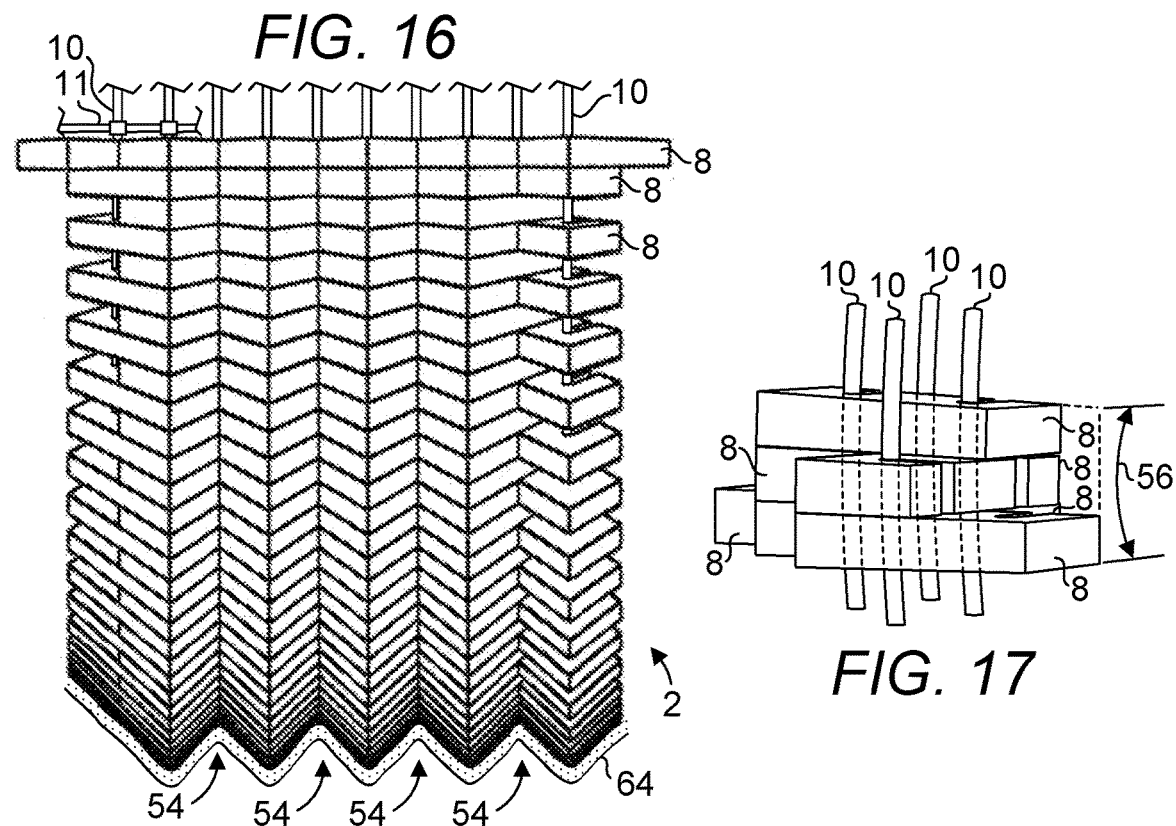
FIG. 16
FIG. 17

FLOATING BASE

BACKGROUND OF THE INVENTION

1. The Field of the Invention

The present invention relates to a floating base. More specifically, the present invention is directed to a high load-bearing floating base constructed from an aggregate of reinforced blocks.

2. Background Art

Land is a finite resource. Many highly sought-after locations for commercial development are in densely populated urban areas where land is both difficult to find and expensive. In many commercial uses, e.g., hotels and mass housing complexes, location is an extremely important factor. There is another issue that commercial land developers face. In most cases, a site will have been previously developed resulting in the expensive and solid waste-generating demolition. Existing services and underground structures and facilities, e.g., drainage pipes, sewers, service ducts, electricity and gas supplies, may need to be preserved or re-routed.

Modern engineering has enabled construction over bodies of water. In many cities adjacent to rivers, lakes or the ocean, the waterfront and shoreline have become highly desirable and attractive sites for high-value commercial or residential development. Former port areas and docks may be particularly well-suited to development.

Some developers have use land reclamation in that, an area of water is converted to land by drainage, infilling or other means. However, land reclamation is expensive, permanent, and dramatically alters the environment physically and visually. An alternative approach is to build on raised decks or platforms supported on structures which are anchored or set in to the river, lake or sea bed. Examples include buildings constructed on piers, and homes built on stilt-like pillars. These are not visually attractive and have structural limitations according to the weight the supporting structure can bear.

Another method of development is to design or adapt a boat or similar vessel for commercial or residential development. Such vessels are usually semi-permanently moored in a suitable location adjacent to land, and access and services are connected to the vessel from the shore, river bank or quayside. Examples include houseboats, casino boats, prison ships, and the adaptation of cruise ships or other vessels for use as floating hotels or entertainment venues. However, there are drawbacks to this approach, most especially the inflexibility of the architecture. Some features are necessary for structural support and some features may be difficult or costly to change. This is less desirable than the flexibility of new-build developments offer. Similarly, the external appearance of the vessel usually remains identifiable as a boat or ship, which will be undesirable for many projects due to its shape, building code requirements or the lack of them, etc. Furthermore, the size and weight of the development is dictated by the underlying vessel and is therefore subject to the engineering constraints of boat-building rather than land-based construction. This can restrict the permissible size of vessel-based developments. There can also be extreme cost and difficulty of fitting or maneuvering a large vessel in a confined space.

Another problem with land development lies in its permanency. Often, the need for residential buildings is seasonal, e.g., in the case of a dormitory situation where the need only exists in the spring and fall semesters. At other times, the residential buildings may be vacated due to the education institution to which the residential buildings are attached is not in session. As the location of a land building is fixed, it is impossible to make the land building multi-use when its location does not lend itself to be easily occupiable in certain times of a year. Conversely, a floating building may be towed to a location where it can meet the needs of tourists or travelers, e.g., during the peak summer travel season. Yet further, instead of building a massive and fixed structure to withstand occasional environmental forces that occur sparingly, a smaller floating structure can lessen the impact of such environmental forces by absorbing such forces as it can "move" as a result of such forces or tolerate such forces due to its mobility.

Floating or floatable buildings have been introduced in the prior art. For example, U.S. Pat. No. 6,199,502 discloses the use of connectable concrete flotation modules with polystyrene cores to create a floating pontoon on which structures can be supported. Since the flotation modules are designed to be transportable by land vehicles, a large number of modules are required to create a floating platform of modest size. This design also has limits as to the weight that can be supported by the platform.

There are also structures which include buoyant elements which serve to lift the building when the water level rises to avoid flooding. U.S. Pat. No. 5,647,693 describes a floatable building having a watertight concrete basement of unitary construction which provides buoyancy in the event that the site of the building is flooded. Since the walls of the basement structure support the floor joists and walls of the building above, there is inherent limitations and design freedom. Access to the basement is also compromised in this airtight design. The basement is constructed at the site of the building, and remains in place after construction until floodwater raises the building.

U.S. Pat. Pub. No. 2011/0123275 of Nelson (hereinafter Nelson) discloses a floating base for a building, the base comprising at least one buoyant basement unit defining a basement level, and a reinforced concrete transfer slab atop the or each basement unit. The basement level provides habitable or functional space for the building, and the transfer slab has at least one access opening giving access to the basement level. The base comprises at least two buoyant basement units, wherein each of the basement units is independently buoyant for assembly with at least one other basement unit during construction of the base, the basement units thereby assuming a final position in which the units are closely adjacent or in contact to define a basement level comprising two or more of the units. Nelson's disclosure extends to a method for constructing a floating base for a building, and a method for launching a buoyant basement unit.

Although prior disclosures show construction techniques that also involve using concrete, forms are still required to aid in such constructions. Conventional ship building techniques call for the use of metal, e.g., steel, to form the shell of a ship. This requires not only a large fabrication facility capable of providing support and hoisting of heavy loads over a large area. None of these prior disclosures show construction techniques for a floating base that is both additive and lends itself to be carried out in an environment without the proper support of heavy machineries and equipment. There arises a need for a construction technique and material which can be applied to the construction of a floating base in remote locations or any locations that lack large shipyards or a floating base which can be accomplished without a conventional shipyard and a floating base which can be accomplished using the concept of additive manufacturing.

SUMMARY OF THE INVENTION

In accordance with the present invention, there is provided a floating base including a shell constructed from a plurality of blocks.

In one embodiment, the shell is constructed from a plurality of blocks that are reinforced with at least one tensile element.

In one embodiment, the at least one tensile element is a rebar, cable, Kevlar® element, polymeric element, chain, mesh or any combinations thereof.

In one embodiment, the at least one tensile element is corrosion-resistant.

In one embodiment, the at least one tensile element includes basalt fibers and epoxy resin.

In one embodiment, the shell includes an outer barrier configured for resisting exposure of the plurality of blocks to moisture.

In one embodiment, at least one of the plurality of blocks is constructed from concrete, ceramics, glass, polymer, wood, metal or any combinations thereof.

In one embodiment, the plurality of blocks are blocks configured for forming a curved structure.

In one embodiment, the shell includes a generally rectangular bottom wall having four edges, a side wall extending from each of the four edges and at least one of the edges is curved.

In one embodiment, the shell includes at least one curved surface.

In one embodiment, the shell includes a generally rectangular bottom wall having four edges, a side wall extending from each of the four edges to form four corners, wherein at least one of the corners is formed from blocks configured for forming a curved structure.

In one embodiment, the shell includes an inner space, a length, a width and at least one bulkhead disposed across the width along the length within the shell to strengthen the shell.

In one embodiment, the shell further includes a spine disposed substantially at right angle to the at least one bulkhead to further strengthen the shell.

In one embodiment, at least one of the plurality of blocks is non-orthogonal.

In one embodiment, the shell includes an inner space, the floating base further includes buoyant non-absorbent material captured within a portion of the inner space to provide flotation if the shell is breached.

In one embodiment, the plurality of blocks are arranged in a manner in which their high-strength axes are aligned normal to the outer surface of the shell.

In one embodiment, the shell is constructed in the shape of a sphere.

An object of the present invention is to provide a floating base that can be constructed from a plurality of blocks.

Another object of the present invention is to provide a structure that is constructed from blocks where the structure is sufficiently strong for use as a floating base.

Another object of the present invention is to provide a method for constructing a floating base that is additive in nature to avoid the need for large forms or large-scale ship building facilities to be required.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 15 is a side view of a portion of a curved shell constructed from a plurality of blocks and tensile elements.

FIG. 16 is another side view of a portion of a curved shell constructed from a plurality of blocks and tensile elements.

FIG. 17 is a view of a plurality of blocks installed around four rebars and the general trend of the resultant block assembly curving towards one direction.

PARTS LIST

2—floating base
4—bulkhead
6—spine
8—block
10—rebar
11—rebar
12—surface structure
14—floor
16—direction in which bulkhead is laid
18—direction in which spine is laid
20—open core
22—closed core
24—channel
26—angle
28—angle
30—length
32—length
34—mobile platform
36—rolling device
38—solid ground support
40—part of floating base to be constructed upon deployment
42—body of water
44—tow rope
46—buoyant non-absorbent material
48—fluid conductor
50—knockout
52—pin
54—groove
56—angle
58—curved surface
60—mortar
62—center of circle
64—barrier
66—base of bottom wall of shell
68—floor
70—spread between bulkheads

PARTICULAR ADVANTAGES OF THE INVENTION

The present floating base is constructed from a plurality of blocks and as such a large structure can be constructed from units that are each much smaller than the finished floating base. This additive construction technique lends itself to construction sites which do not have dedicated ship-building or heavy equipment construction facilities. Further, as the floating base is constructed from small units, no large and a single monolithic form is required as in the case of a poured concrete construction scenario. Yet further, the floating base does not need to be fully constructed before it can be deployed or moved to location, thereby allowing the transportation of a smaller structure to location and avoiding the need to transport a much heavier and a more massive structure. In one embodiment, the floating base can be assembled as an aggregate of spheres. Therefore, in addition to each sphere being constructed using the additive technique, the floating base can be constructed by assembling a plurality of spheres on-site before a floor or deck is constructed atop the support and buoyancy afforded by the spheres or the floor installed atop the spheres on-site.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
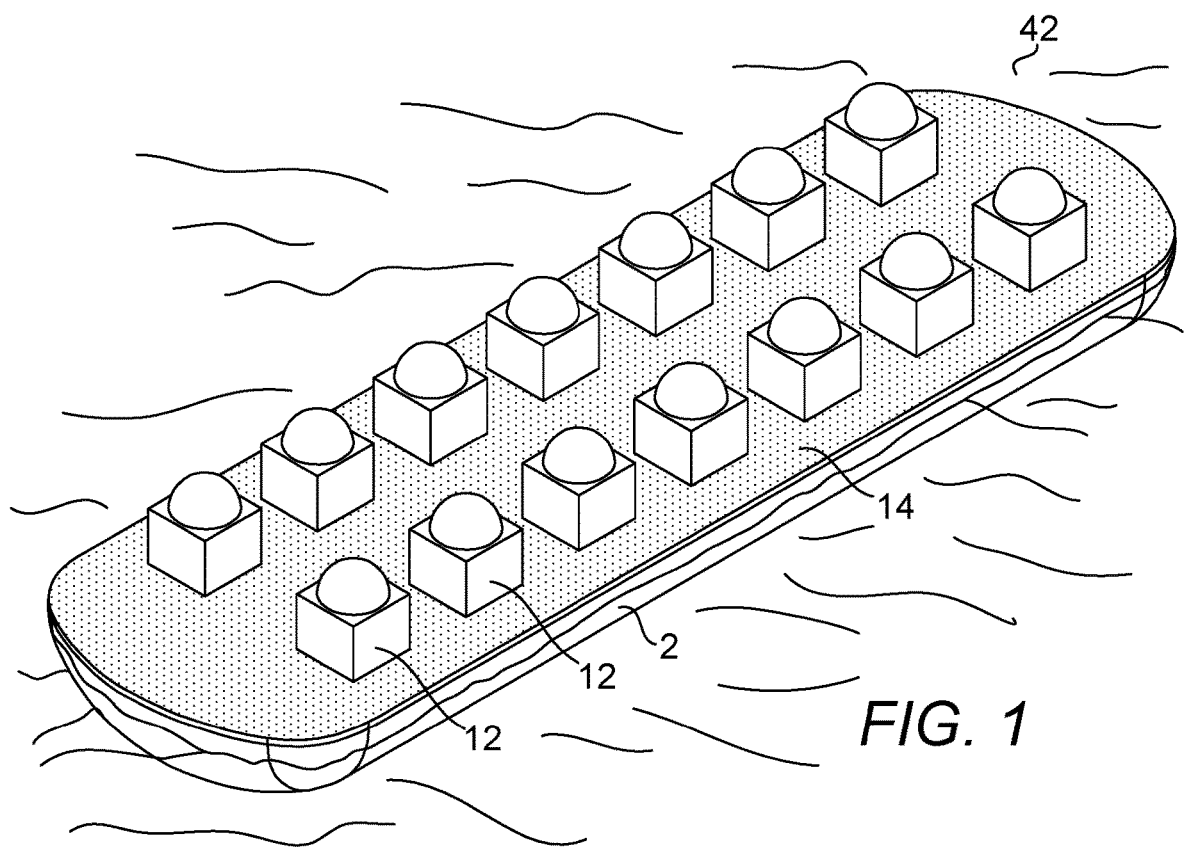
FIG. 1 is a top perspective view of one embodiment of a floating base constructed from a plurality of blocks and a plurality of surface structures supported atop the floating base including a floor disposed atop the floating base.
Figure 2:
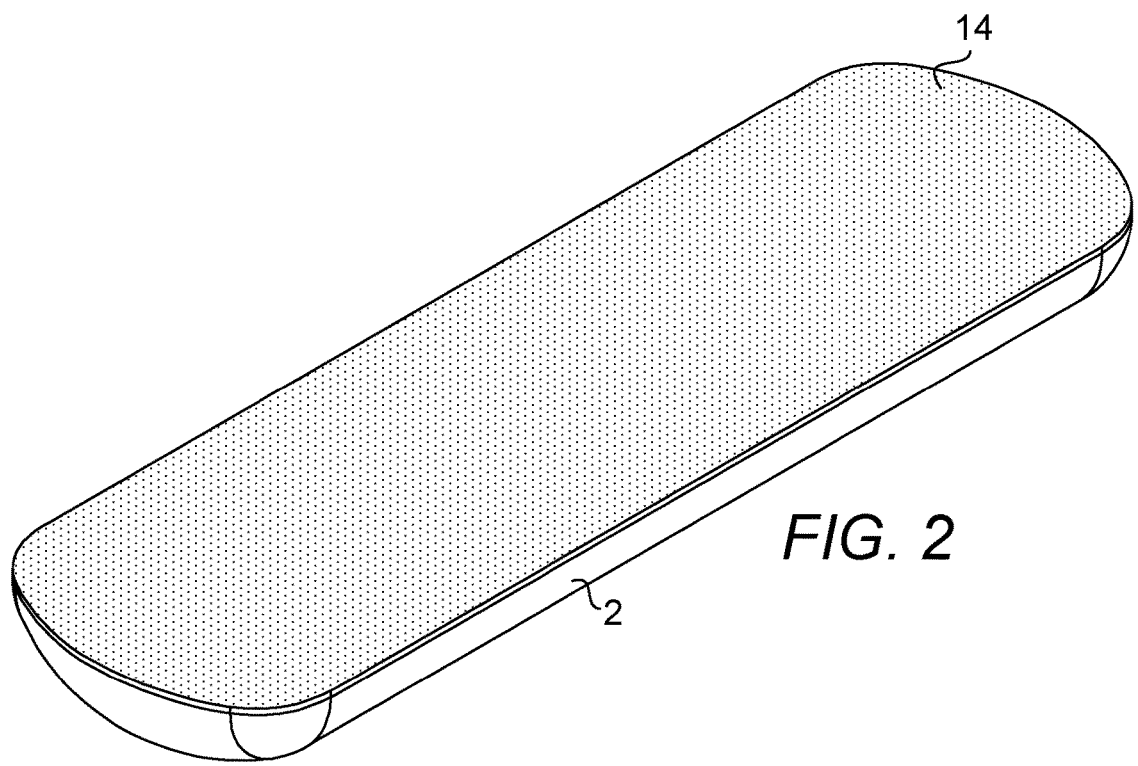
FIG. 2 is a top perspective view of one embodiment of a floating base constructed from a plurality of blocks with only a floor supported by the floating base.
Figure 3:
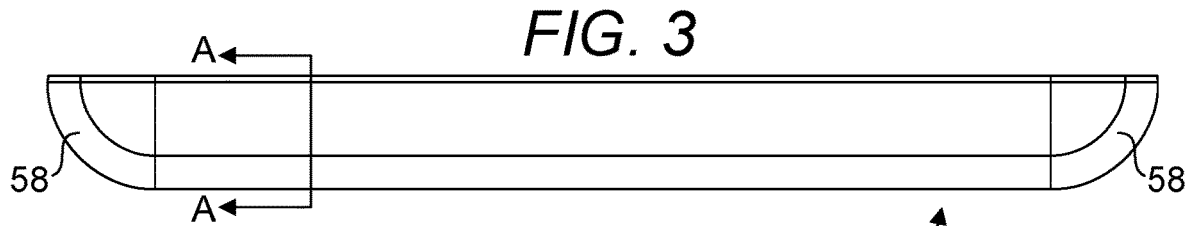
FIG. 3-6 is a side, bottom, end and top view, respectively, of the embodiment of floating base of FIG. 2.
Figure 4:
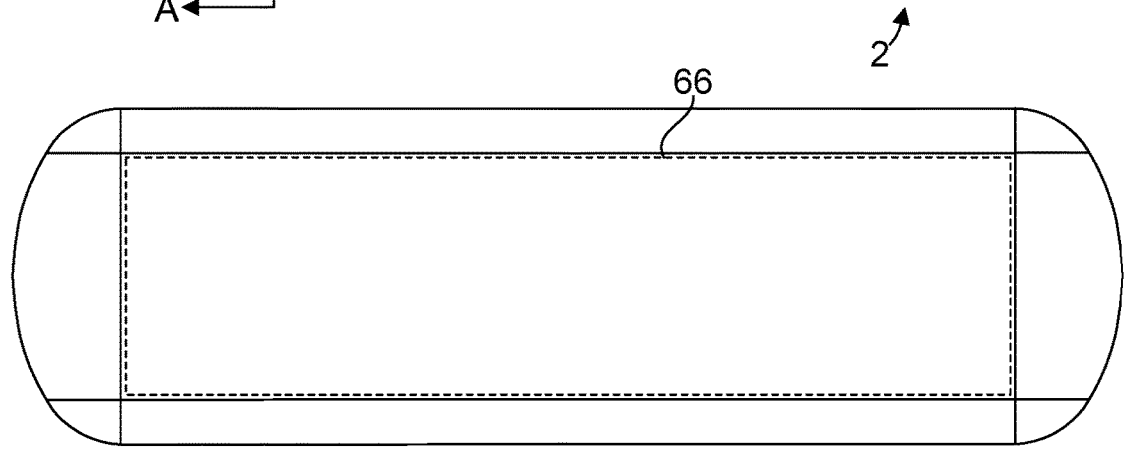
Figure 5:
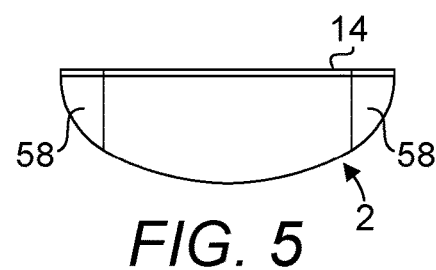
Figure 6:
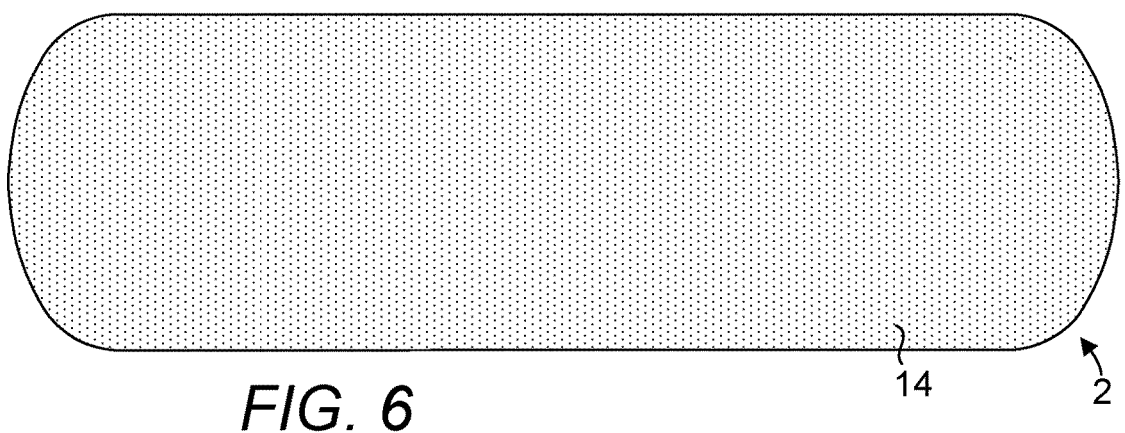

FIG. 1 is a top perspective view of one embodiment of a floating base 2 constructed from a plurality of blocks and a plurality of surface structures 12 supported atop the floating base including a floor or deck 14 disposed atop the floating base 2. FIG. 2 is a top perspective view of one embodiment of a floating base 2 constructed from a plurality of blocks with only a floor 14 supported by the floating base 2. FIG. 3-6 is a side, bottom, end and top view, respectively, of the embodiment of floating base 2 of FIG. 2. In one embodiment, the shell includes a generally rectangular bottom wall 66 having four edges, a side wall extending from each of the four edges and the edges are curved. Note the curved surfaces 58 of the floating base 2 form no sharp corners with the bottom wall 66. Referring to FIGS. 3 and 5, the shell 2 includes a generally rectangular bottom wall 66 having four edges, a side wall extending from each of the four edges to form four corners, each corner is formed from blocks configured for forming a curved structure. It shall be apparent then that the outer surface of the shell is a contiguous curved surface. Referring back to FIG. 1, modular housings, custom housing units or structures of other purposes may be raised above and attached to the floor 14 of the floating base 2. Openings or hatches not shown herein, may be made available to allow access to the below deck rooms or inner space of the shell where various activities can be performed, such as farming or dining, etc. In one embodiment, the deck is a bubble deck constructed according to materials and techniques disclosed in Indian Pat. Pub. IN201621005984A. In another embodiment, a conventional concrete deck is used as long as the deck properly seals the opening of the shell of the floating base 2 to avoid inadvertent flooding of the inner space.

Figure 7:
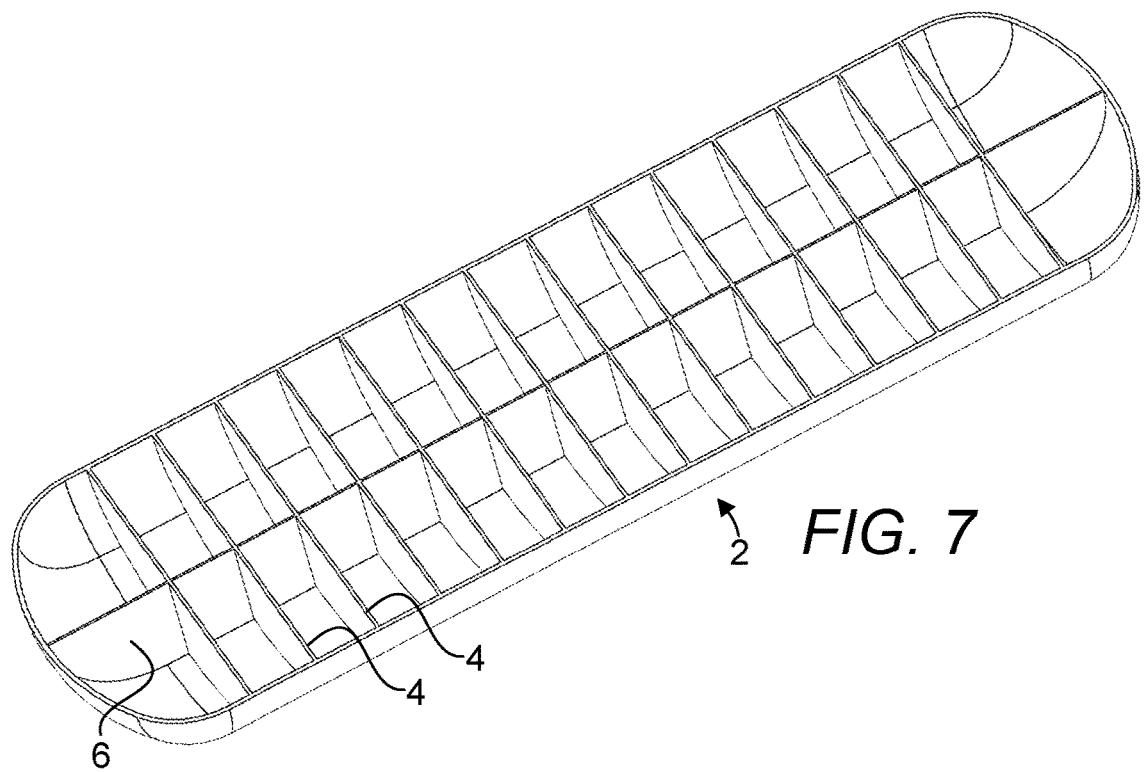
FIG. 7 is a top perspective view of one embodiment of a floating base with a shell constructed from a plurality of blocks where the shell is strengthened with a plurality of bulkheads and a spine.
Figure 8:
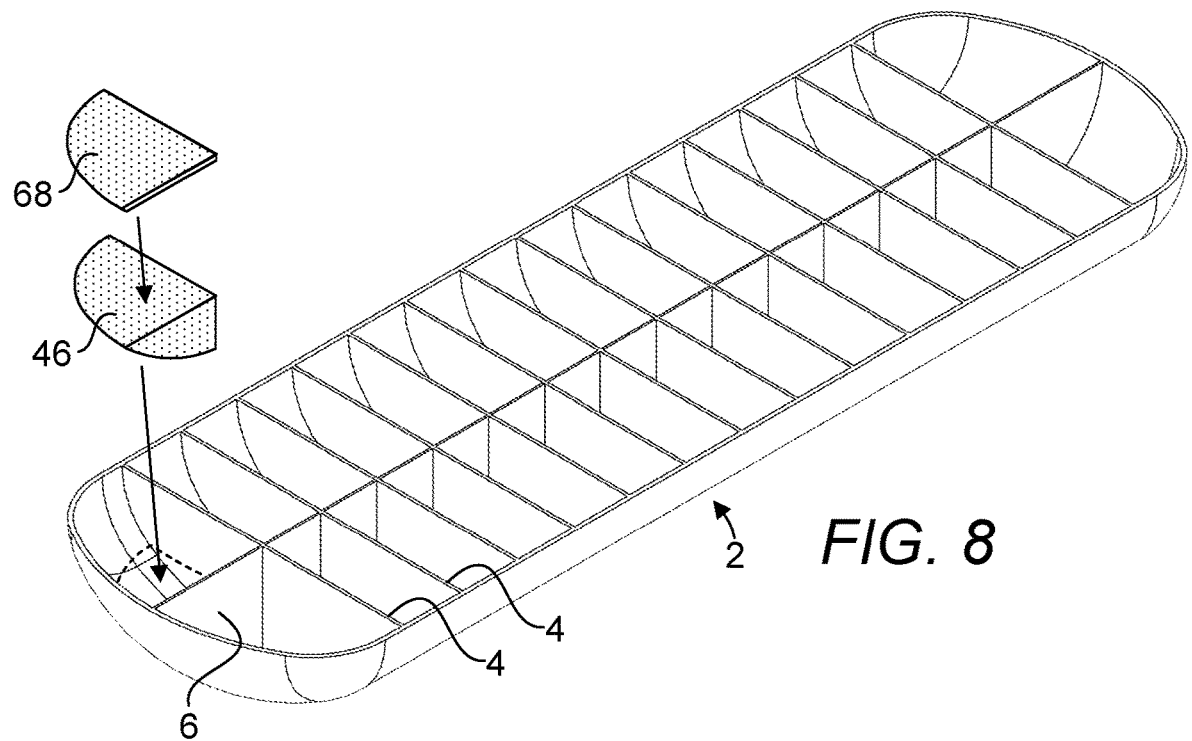
FIG. 8 is another top perspective view of the embodiment shown in FIG. 7.

FIG. 7 is a top perspective view of one embodiment of a floating base 2 with a shell constructed from a plurality of blocks where the shell is strengthened with a plurality of bulkheads 4 and a spine 6. FIG. 8 is another top perspective view of the embodiment shown in FIG. 7. In the embodiment shown, the shell includes an inner space, a length and a width and a plurality of bulkheads 4 disposed across the width along the length of the shell within the shell to strengthen the shell. At least a portion of the floating base 2 is filled with a buoyant non-absorbent material suitable to displace water and provide flotation if the shell is breached. Such a material is preferably disposed in a space not otherwise useful for other purposes and must be properly captured under a structure, e.g., a floor 68 to prevent its escape should it be relied upon for flotation in times of emergency. Only one block of buoyant non-absorbent material 46 is shown although such materials can be dispersed throughout the shell to suitably provide flotation to ensure that the surface structures 12 are not significantly compromised or submerged should the floating base 2 can no longer support design weight of the surface structures 12, e.g., if the floating base 2 is breached. In installing a buoyant non-absorbent material, a space dedicated for such a material is preferably formed first before such a material is injected into the space to cure in place, thereby taking the shape of the space. In one example, bulkheads 4 are spaced 20 ft. apart (see part 70 of FIG. 9) and constructed from 6-inch wide concrete blocks. In one example, the floating base measures about 300 ft. long, 100 ft. wide and 30 ft. deep and is deployed in a body of water of about 40 ft. deep. In the embodiment shown, a spine 6 is disposed along the length of the floating base 2, linking the bulkheads 4 and strengthening essentially the support structures of the floating base 2. Bulkheads and spine may be constructed alternatively from a metal and polymeric material as long as the material is capable of providing sufficient tensile strength to the shell.

Figure 9:
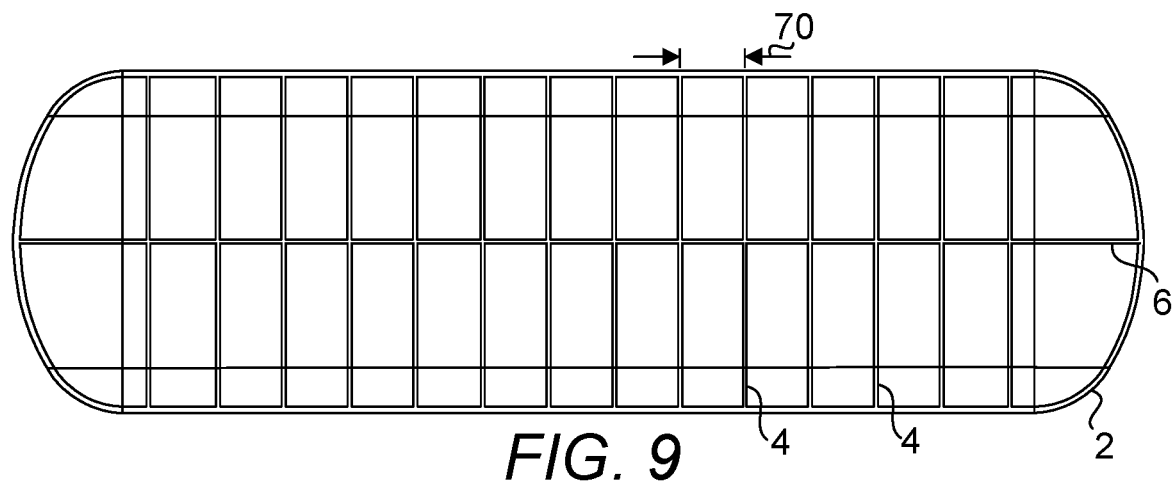
FIG. 9 is a top view of the embodiment shown in FIG. 7.
Figure 10:
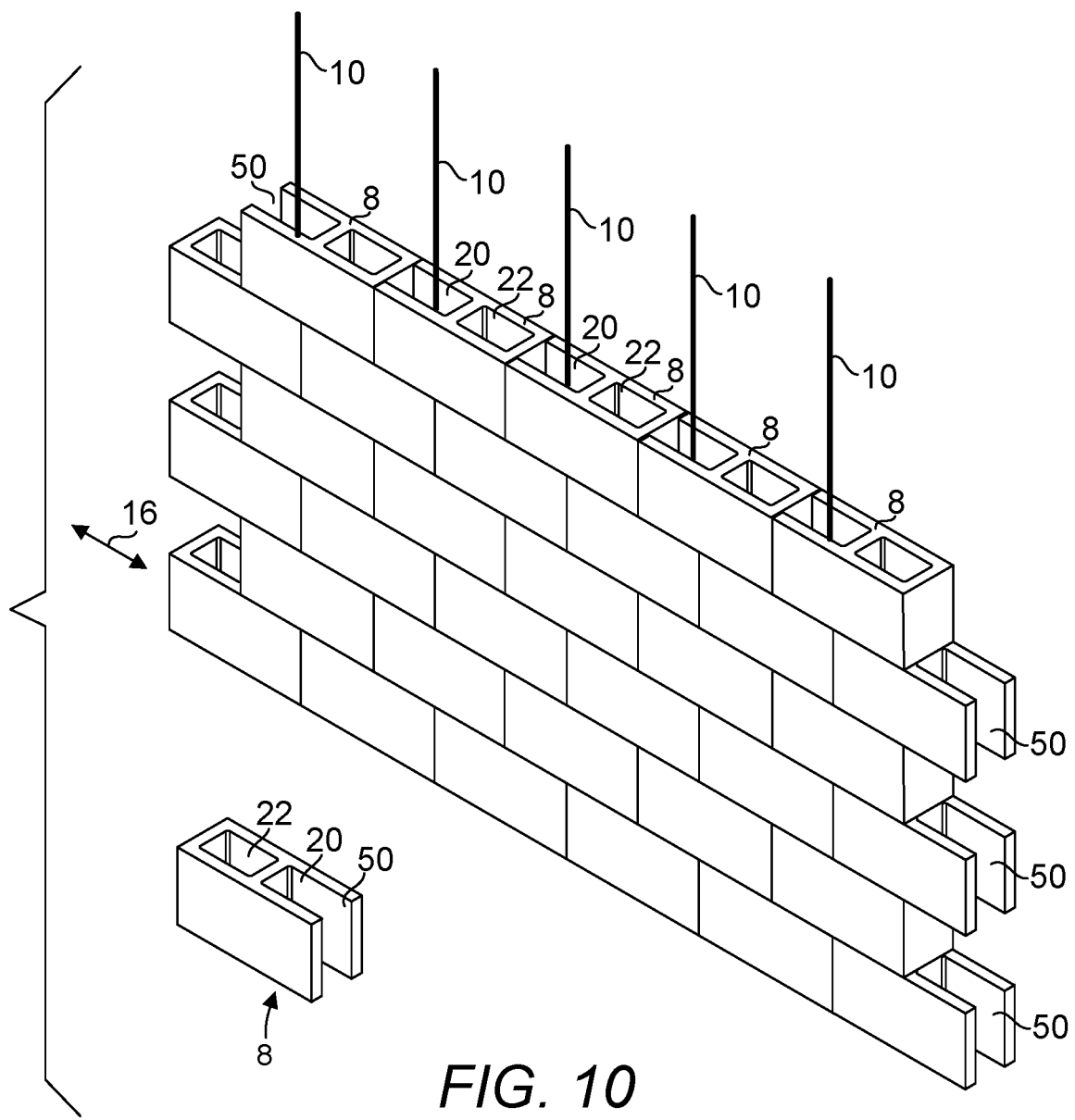
FIG. 10 is a top perspective view of one embodiment of a portion of a bulkhead of the present floating base.

FIG. 9 is a top view of the embodiment shown in FIG. 7. FIG. 10 is a top perspective view of one embodiment of a portion of a bulkhead 4 of the present floating base. Also shown is a top perspective view of one embodiment of a block suitable for use in constructing the bulkhead 4. Bulkheads 4 are useful in tying the port and starboard sides of the floating base 2, strengthening the floating base 2. Note that each block 8 has two cores including an open core 20 and a closed core 22. The open core 20 can be formed from a closed core 22 by knocking out an edge of the closed core to form a knockout 50 or it can be formed in the final shape shown. Note that rebars are placed in every other core hole in each row of ubiquitous blocks, such arrangement is facilitated by blocks each with an open core 20 disposed adjacent a closed core 22 longitudinally. Rebars 10 are first erected in an upright fashion where they are connected to an underlying structure, e.g., the shell. Blocks are then installed in direction 16 with conventional block construction techniques and materials, e.g., mortar, each block with open core 20 surrounding a rebar 10 before the cores are filled.

Figure 11:
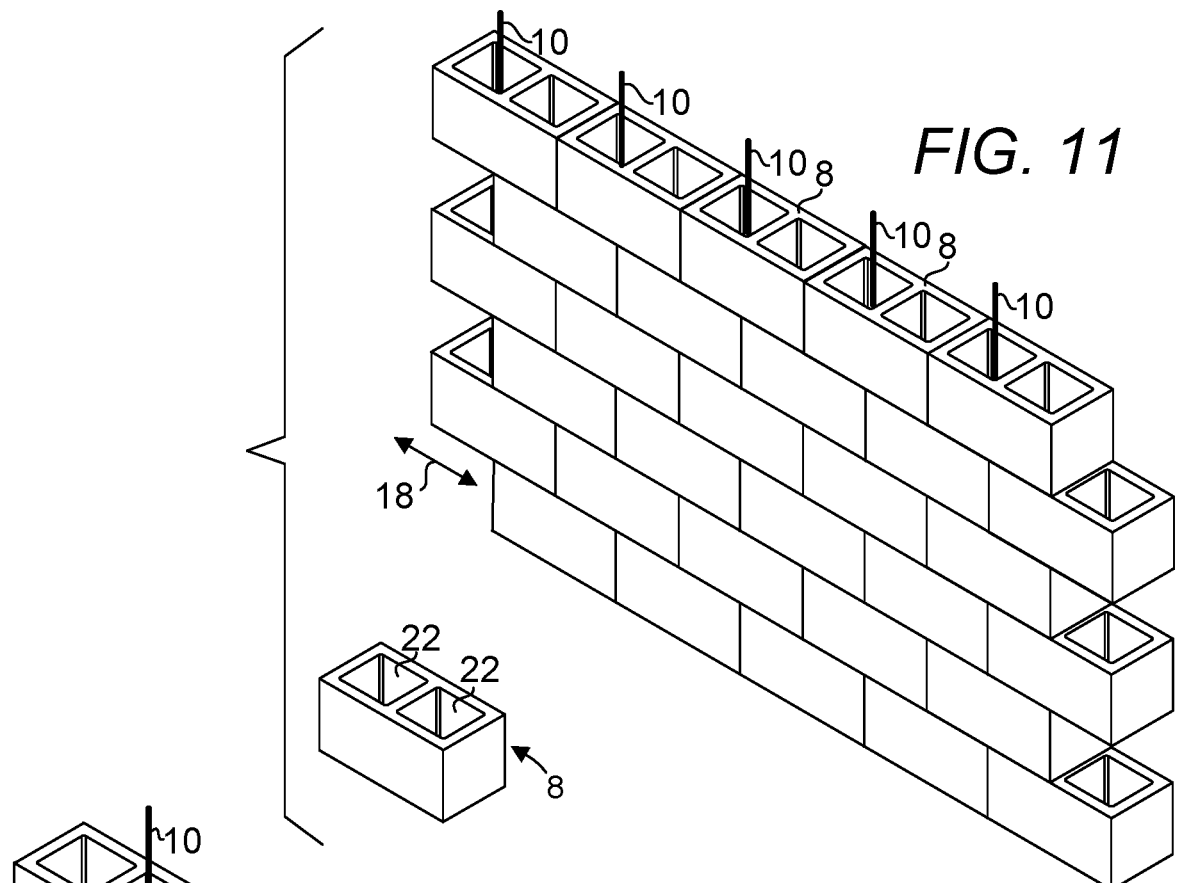
FIG. 11 is a top perspective view of one embodiment of a portion of a spine of the present floating base.

FIG. 11 is a top perspective view of one embodiment of a portion of a spine 6 of the present floating base laid in direction 18. The spine 6 connects the bow and stern of the floating base, further strengthening the floating base as a whole. Blocks similar to those used for the bulkhead 4 may be used in constructing the spine 6 as well. However, an even more ubiquitous type of blocks can be used, i.e., one which two closed cores 22. Also shown in the same figure is a top perspective view of one embodiment of a block suitable for constructing a spine, e.g., a block with two closed cores 22 arranged longitudinally. Conventional rebar installation techniques may be used in any instances of rebar installations in the construction of any parts of the shell including the bulkheads and spine.

Figure 12:
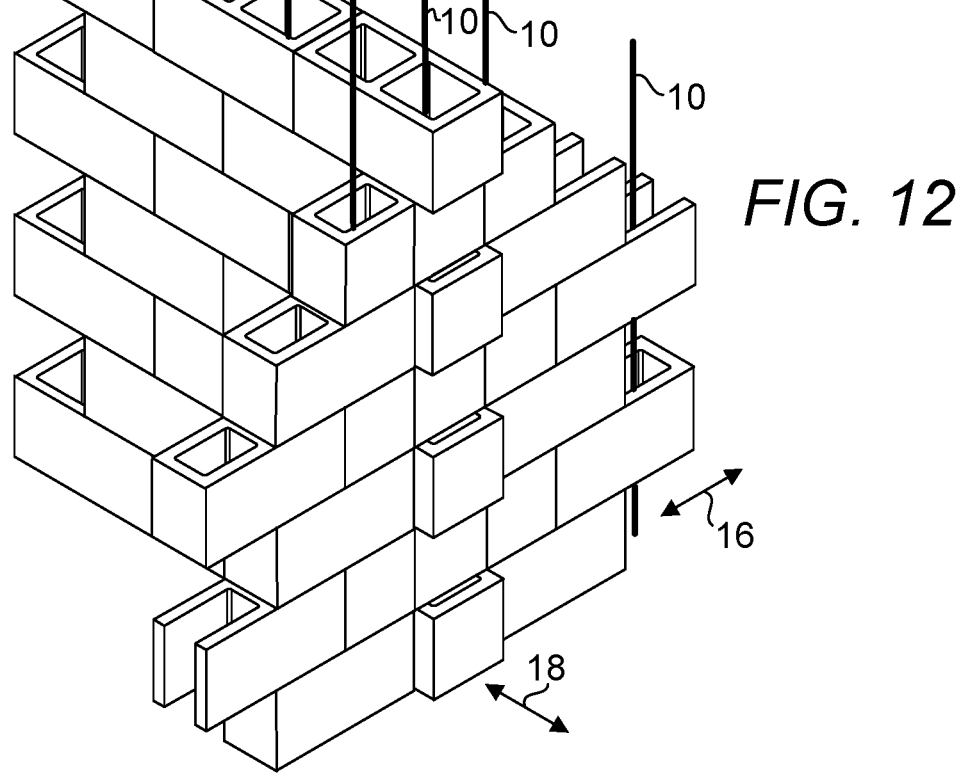
FIG. 12 is a top perspective view of one embodiment of a portion of an interface of a bulkhead and a spine.

FIG. 12 is a top perspective view of one embodiment of a portion of an interface of a bulkhead 4 and a spine 6. It shall be noted that the blocks used for constructing the bulkhead 4 are interlocked with the blocks used for constructing the spine 6 while rebars 10 are used according to standard block construction techniques incorporating rebars in creating a grid-like network of rebars 10 to increase the tensile strength of the assembled blocks. Further, single-core blocks may also be used. Similar rebar installation techniques are used throughout the construction of the shell. Other tensile elements may be used, e.g., cable, Kevlar®, polymer, chain, mesh or any combinations thereof. In one embodiment, tensile elements are corrosion-resistant. The use of a corrosion-resistant material is important in that even if the tensile elements are exposed to moisture, e.g., if its encapsulating material, e.g., the blocks and mortar have been breached, it will not rust and deteriorate. In one embodiment, the tensile element includes basalt fibers and epoxy resin. In one embodiment, the tensile element includes a GatorBar® or a fiber-reinforced polymer rebar.

Figure 13:
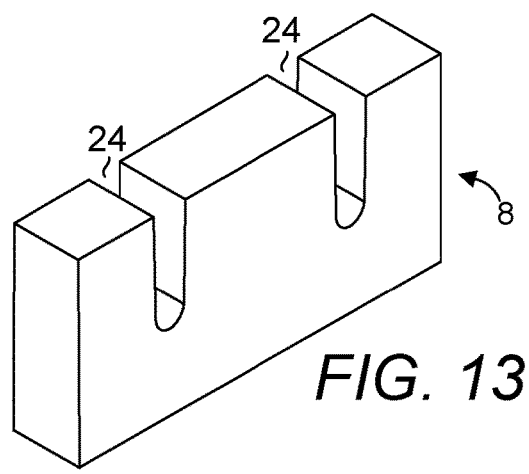
FIG. 13 is a top perspective view of one embodiment of a block suitable for constructing a curved surface, e.g., a shell.

FIG. 13 is a top perspective view of one embodiment of a block suitable for constructing a curved surface, e.g., a shell. In one embodiment, blocks suitable for the construction of the present shell include blocks disclosed in U.S. Pat. No. 9,133,619 to Roberts et al. It shall be noted that there are two channels each allocated to allow one or more rebars to be deployed as shown in FIGS. 15-17. In one embodiment, the plurality of blocks are arranged in a manner in which their high-strength axes are aligned normal to the outer surface of the shell such that it can readily resist the hydro-static and dynamic pressure experienced on the outer surface of the shell. In one embodiment, at least one of the plurality of blocks is constructed from concrete, ceramics, glass, polymer, wood, metal or any combinations thereof.

Figure 14:
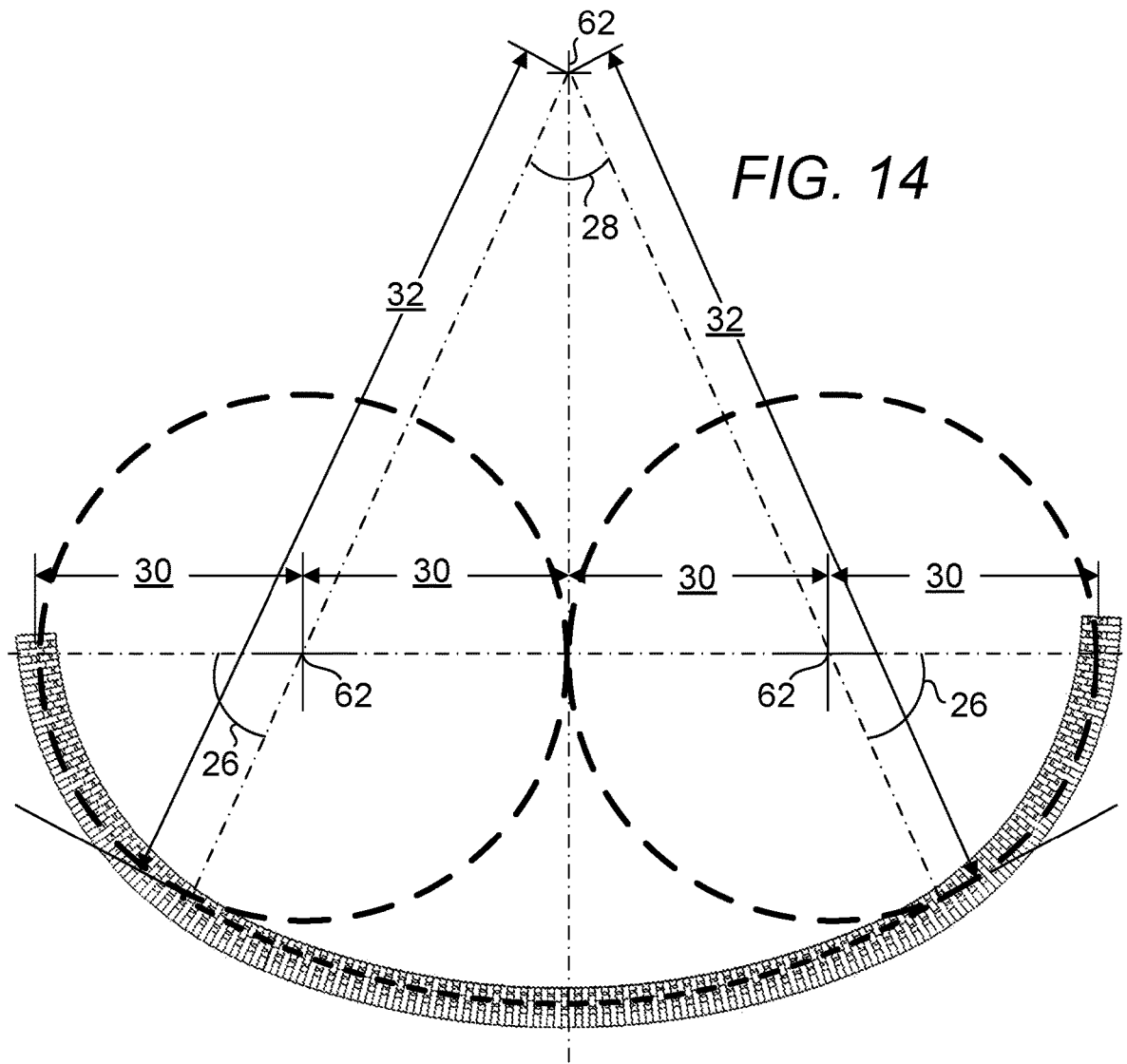
FIG. 14 depicts a cross-sectional profile of a shell of a present floating base, depicting a three-centered shell profile.

FIG. 14 depicts a cross-sectional profile of a shell of a present floating base 2, depicting a three-centered shell profile as taken along line A-A of FIG. 3. While the present shell is configured to avoid sharp corners as curved structures can more readily withstand hydrostatic and hydrodynamic pressures as buoyant forces are created to support the shell and the structures built within and upon the shell, in the construction process, the manner in which blocks fit together to form the curved surfaces must also be considered. In one embodiment, a cross-sectional profile of the shell may be a three-centered arch with each center labelled 62. In describing the three-centered shell profile, it is imperative to show the radii of these centers 62 of two smaller circles with a radius of length 30 placed side-by-side and a larger circle with a radius with length 32. Note that a partial circumference with radius of length 32 can be shown to trace the keel of the shell while a partial circumference of with radius of length 30 can be shown to trace a side wall of the shell. When a radius is drawn through each center of the smaller circles and culminating at a center of the larger circle 62, angle 26, i.e., angle that is made between a radius of a smaller circle that is disposed horizontally and a portion of a radius of the larger circle that is drawn to intersect a center of the smaller circle, can be shown to assume about 60 degrees. In one example, length 30 is about 25 ft. and length 32 is about 75 ft. The partial circumference of the larger circle encompasses an angle 28 of about 60 degrees.

FIG. 15 is a side view of a portion of a curved shell 2 constructed from a plurality of blocks and tensile elements 10. FIG. 16 is another side view of a portion of a curved shell 2 constructed from a plurality of blocks and tensile elements 10. It shall be noted that the blocks are arranged in a manner to collectively positively surround all tensile elements 10 in the axial direction, leaving the resulting structure to have grooves 54. Note that these details are not depicted in figures depicting the general shape of the floating base 2 as in FIGS. 1-9. Tensile elements 11 may also be installed in a direction generally perpendicular to the axially-installed tensile elements 10 to further stiffen the resulting structure constructed from blocks 8 as shown in FIG. 16. FIG. 17 is a view of a plurality of blocks installed around four rebars 10 and the general trend of the resultant block assembly curving towards one direction as angle 56 is non-zero. In one embodiment, the shell includes an outer barrier 64, e.g., coating of polymeric materials configured for resisting exposure of the blocks 8 to moisture although without this barrier, the shell can continue to function as the installed blocks are already watertight.

In one embodiment, at least one of the plurality of blocks is "non-orthogonal." The term "non-orthogonal" is used herein to define two adjacent surfaces of a block that are not disposed at a right angle in order for a curved surface to be formed from a plurality of such a block while still conforming to the U.S. nominal concrete masonry unit size of 16 inches by 8 inches by 8 inches. Note that blocks used for constructing a flat wall normally come with adjacent surfaces disposed at right angle.

In a block manufacturing process, it is critical to form blocks having their high-strength axis aligned in a load bearing direction. Materials, e.g., concrete, is an anisotropic material. It has a higher compressive strength in the axis of compaction as blocks are made. The present blocks used for constructing structures are arranged in a manner where the high-strength axis of each block is oriented in the direction substantially parallel to the direction in which environmental, e.g., hydrostatic forces are prevalent. In constructing a present block, raw material is first placed within a mold cavity. A "shoe," configured in the external shape of the present block including such features as channels, is then applied atop the raw material, compacting and consolidating the raw material, thereby forming a block having a high-strength axis in the direction in which the compacting action is applied. Contrast this with a concrete pouring process where no compaction is used, therefore failing to result in a wall having a high strength axis.

Figure 18:
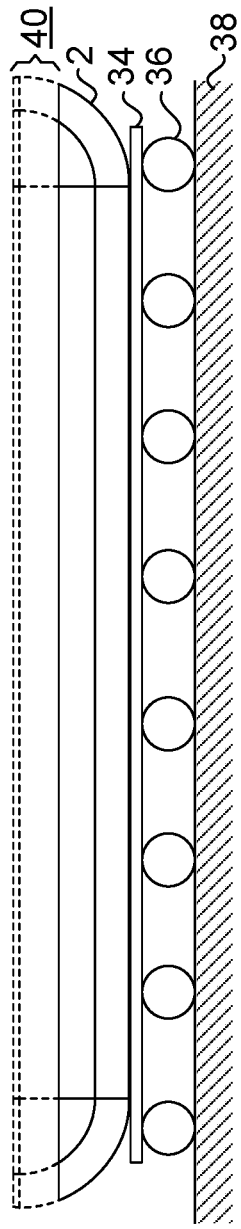
FIGS. 18-20 are diagrams depicting a series of stages through which a floating base is constructed and deployed.
Figure 19:
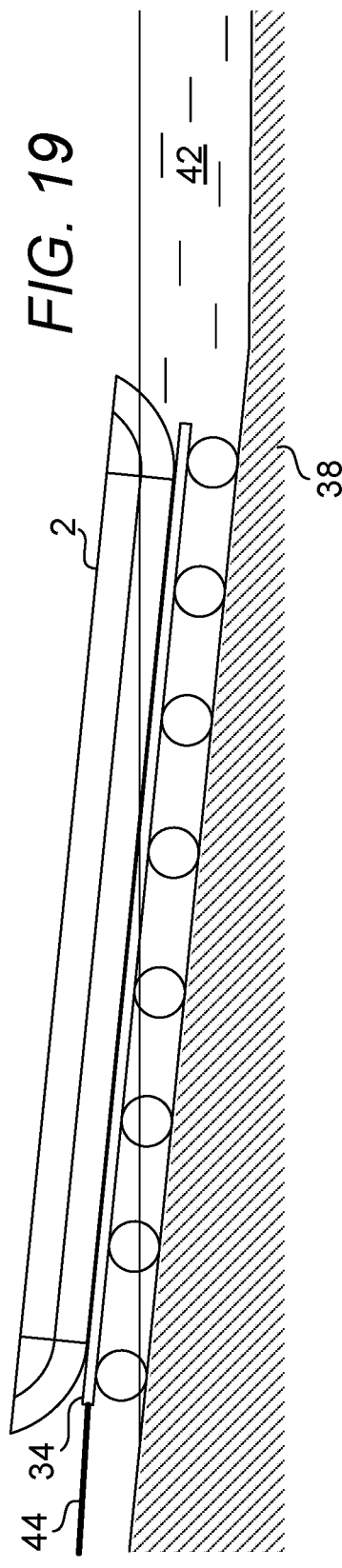
Figure 20:
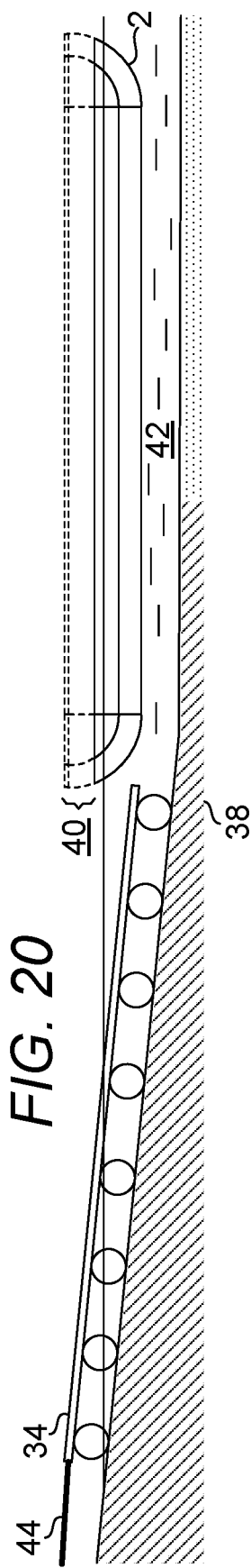

FIGS. 18-20 are diagrams depicting a series of stages through which a floating base 2 is constructed and deployed in order to reduce the requirements for facilitating the construction and deployment of the floating base 2. FIG. 18 depicts a mobile platform 34 upon which a floating base 2 is being constructed to a point where the base 2 is sufficiently buoyant to be deployed to a body of water with a part 40 of the floating base 2 remaining to be constructed. The mobile platform 34 is equipped with a rolling device 36 and disposed on a solid ground support 38 capable of significant load-bearing. FIG. 19 depicts the floating base 2 that has been constructed as shown in FIG. 18, is being lowered via a ramp 38 while being supported with a tow rope 44, into a body of water 42 before being released as shown in FIG. 20. Construction of the floating base 2 can then continue while the base 2 has been deployed into the body of water 42 to add part 40 to the floating base 2. Therefore, the facility within which the floating base 2 is constructed, is not required to hold a fully constructed structure that can include a fully constructed floating base or a fully constructed floating base and any structures supported by the floating base.

Figure 21:
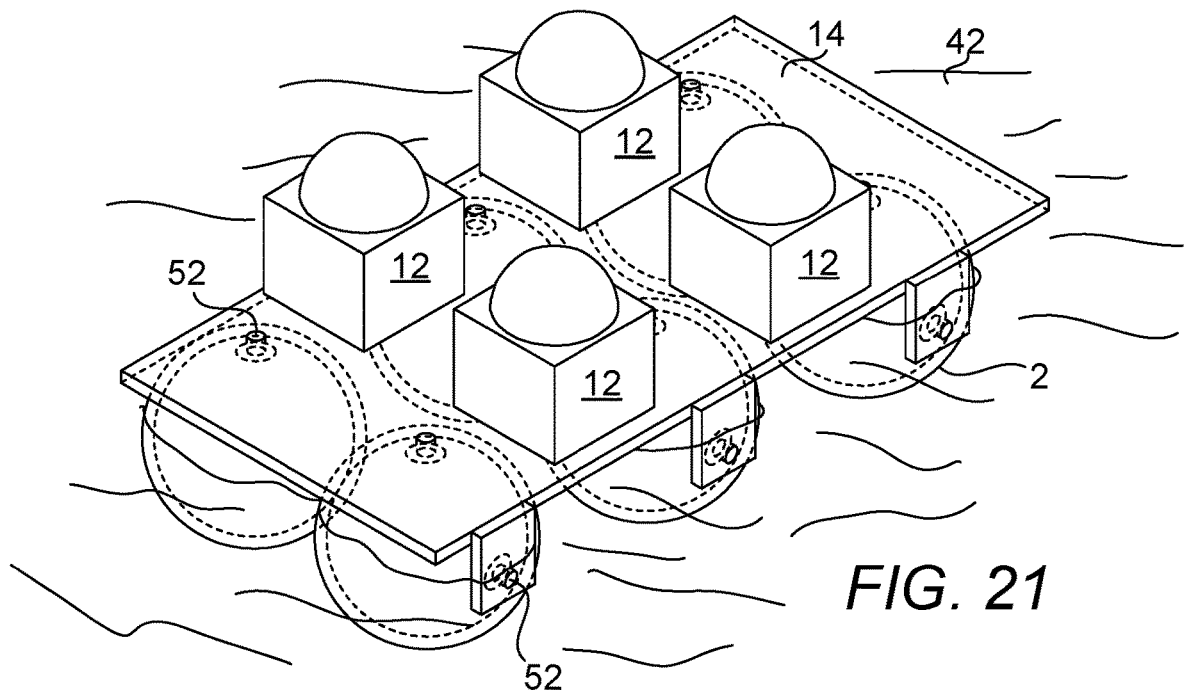
FIG. 21 is a diagram depicting one embodiment of a floating base.

FIG. 21 is a diagram depicting one embodiment of a floating base 2. In this embodiment, the shell of the floating base 2 is a collection of spherically-shaped structures although a single spherical structure may suffice for some applications. Again, the floating base 2 is a structure providing buoyancy and support for a surface structure and each sphere may be constructed from blocks similar to the manner in which the floating bases 2 of FIGS. 1-9 are constructed. In one embodiment, blocks suitable for the construction of the present shell include blocks disclosed in U.S. Pat. No. 9,809,971 to Roberts et al. and U.S. patent application Ser. No. 15/809,693 of Roberts et al. Each sphere is built with necessary pin/s 52 such that it may be securely attached to a frame that may include a floor 14 and other structures or braces. The use of multiple spheres further serves as back-up flotation device ensuring that a total failure of the floating base is unlikely, i.e., if one or more spheres are breached, the floating base will still provide enough buoyancy or support for the surface structures 12.

Figure 22:
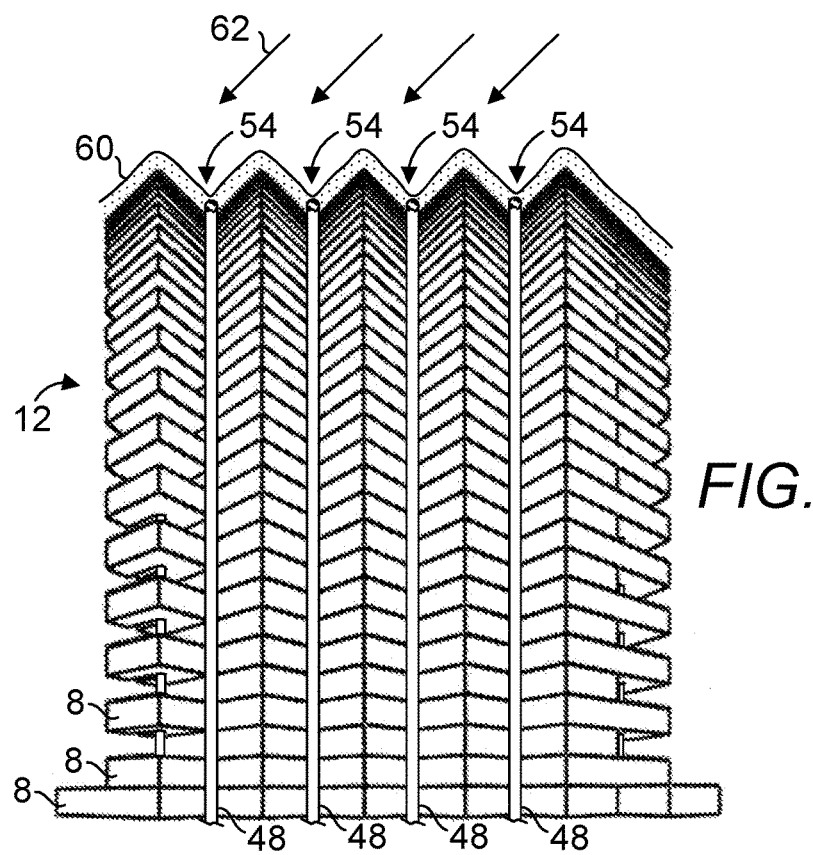
FIG. 22 is a diagram depicting a manner in which the temperature of a surface structure constructed from high thermal mass materials may be regulated.

FIG. 22 is a diagram depicting a manner in which the temperature of a surface structure constructed from high thermal mass materials, e.g., masonry blocks, which forms the roofs or side walls of the structure, may be regulated. In desert climates characterized by high daytime temperatures and low nighttime temperatures, arrangements can be made such that thermal energy can be captured during a certain portion of a day and used at another portion of the day. In this example, a plurality of fluid conductors 48 are conveniently disposed in the grooves 54 formed from an arrangement of blocks which constitute the roof a surface structure, each fluid conductor 48 carrying a fluid capable to be circulated in the fluid conductor 48, e.g., via a low flow and pressure pump. Each fluid conductor 48 is preferably secured to a roof or side wall by application of mortar 60 which not only secures the fluid conductor to the roof or side wall but also serves as a thermal conductor connected to the roof or side wall. During daytime, when sun rays beat down on the surface structure, the thermal mass surrounding the fluid conductors 48 are capable of absorbing and storing heat. During nighttime, as the sun sets, no heat is being added to the roofs or side walls and air temperature can drop below freezing. The fluid in the fluid conductors may be circulated to transfer the heat stored in the roofs or side walls to floors to increase the temperature of interior space enclosed by the roofs or side walls such that the space is more comfortable and habitable. It shall be noted that no additional heat is required to be generated during nighttime as heat is simply stored in the roof or walls when it is not required and transferred to the floor when the space becomes cooler.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A method for constructing a floating base comprising a shell comprising a contiguous outer curved surface, a generally rectangular bottom wall having four edges, a side wall extending from each of the four edges to form four corners, wherein at least one of the corners is formed from blocks configured for forming a curved structure, said method comprising constructing the shell from a plurality of blocks by additive manufacturing, at least one of said plurality of blocks is non-orthogonal such that the contiguous outer curved surface of the shell can be formed.

2. The method of claim 1, further comprising reinforcing said plurality of blocks with at least one tensile element.

3. The method of claim 2, wherein said at least one tensile element is a material selected from the group consisting of a rebar, cable, poly(paraphenylene terephthalamide), polymeric element, chain, mesh and any combinations thereof.

4. The method of claim 2, wherein said at least one tensile element is corrosion-resistant.

5. The method of claim 2, wherein said at least one tensile element comprises basalt fibers and epoxy resin.

6. The method of claim 2, wherein the shell comprises an outer barrier configured for resisting exposure of said plurality of blocks to moisture.

7. The method of claim 1, wherein at least one of said plurality of blocks is constructed from a material selected from the group consisting of concrete, ceramics, glass, polymer, wood, metal and any combinations thereof.

8. The method of claim 1, wherein the shell comprises an inner space, a length and a width and at least one bulkhead disposed across said width along said length within the shell to strengthen the shell.

9. The method of claim 8, further comprising a spine disposed substantially at right angle to said at least one bulkhead to further strengthen the shell.

10. The method of claim 1, further comprising a buoyant non-absorbent material, wherein the shell comprises an inner space within which said buoyant non-absorbent material is captured to provide flotation if the shell is breached.

* * * * *